(12) United States Patent
Guo et al.

(10) Patent No.: US 11,780,097 B2
(45) Date of Patent: Oct. 10, 2023

(54) INFORMATION PROCESSING APPARATUS AND METHOD FOR PROCESSING INFORMATION

(71) Applicant: SONY GROUP CORPORATION, Tokyo (JP)

(72) Inventors: Jingjing Guo, Tokyo (JP); Sayaka Watanabe, Tokyo (JP); Jun Yokono, Tokyo (JP); Natsuko Ozaki, Tokyo (JP); Jianing Wu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 151 days.

(21) Appl. No.: 17/309,429

(22) PCT Filed: Sep. 4, 2019

(86) PCT No.: PCT/JP2019/034802
§ 371 (c)(1),
(2) Date: May 26, 2021

(87) PCT Pub. No.: WO2020/115972
PCT Pub. Date: Jun. 11, 2020

(65) Prior Publication Data
US 2022/0016783 A1 Jan. 20, 2022

(30) Foreign Application Priority Data
Dec. 6, 2018 (JP) .................................. 2018-228928

(51) Int. Cl.
*B25J 9/16* (2006.01)
*B25J 13/08* (2006.01)
*G06T 7/70* (2017.01)

(52) U.S. Cl.
CPC ............. *B25J 9/1697* (2013.01); *B25J 9/163* (2013.01); *B25J 13/08* (2013.01); *G06T 7/70* (2017.01); *G06T 2207/30196* (2013.01)

(58) Field of Classification Search
CPC . B25J 9/1697; B25J 9/163; B25J 13/08; B25J 11/008; G06T 7/70;
(Continued)

(56) References Cited

U.S. PATENT DOCUMENTS 7,536,029 B2 * 5/2009 Choi ...................... G01S 3/7864
382/103
7,570,781 B2 * 8/2009 Rhoads .............. H04N 1/00005
463/16
(Continued)

FOREIGN PATENT DOCUMENTS

CN 103002239 A 3/2013
EP 1643769 A1 4/2006
(Continued)

OTHER PUBLICATIONS

International Search Report and Written Opinion of PCT Application No. PCT/JP2019/034802, dated Nov. 26, 2019, 11 pages of ISRWO.

*Primary Examiner* — Jaime Figueroa
(74) *Attorney, Agent, or Firm* — CHIP LAW GROUP (57) ABSTRACT

There is provided an information processing apparatus including a reality determiner that determines whether an object detected on the basis of sensing data is a real object or an unreal object, and a controller that performs predetermined control on the basis of a result of the determination made by the reality determiner.

15 Claims, 10 Drawing Sheets

(58) Field of Classification Search
CPC .......... G06T 2207/30196; G06V 20/10; G06V 40/40; A63H 11/00
USPC ................ 700/245–264; 318/568.11–568.25
See application file for complete search history.

(56) References Cited

U.S. PATENT DOCUMENTS

| | | | | |
|---|---|---|---|---|
| 7,847,678 B2 * | 12/2010 | Kawamata | ............ | G08G 1/166 340/425.5 |
| 8,787,622 B2 * | 7/2014 | Watanabe | ............ | G06V 40/23 382/115 |
| 8,873,813 B2 * | 10/2014 | Tadayon | ............ | G06V 40/172 382/118 |
| 9,355,451 B2 * | 5/2016 | Oi | ............ | G01C 21/3647 |
| 9,916,538 B2 * | 3/2018 | Zadeh | ............ | A61B 5/165 |
| 10,262,243 B2 * | 4/2019 | Lim | ............ | G06T 3/4053 |
| 10,402,661 B2 * | 9/2019 | Kavadeles | ............ | G06V 20/52 |
| 10,423,226 B2 * | 9/2019 | Chen | ............ | G06F 3/017 |
| 11,257,294 B2 * | 2/2022 | Zhao | ............ | G06T 5/002 |
| 11,461,582 B2 * | 10/2022 | Jordan | ............ | G06V 20/10 |
| 2005/0069171 A1 * | 3/2005 | Rhoads | ............ | G07D 7/0034 382/100 |
| 2006/0075422 A1 | 4/2006 | Choi et al. | | |
| 2008/0204208 A1 * | 8/2008 | Kawamata | ............ | B60R 1/00 340/435 |
| 2010/0127827 A1 * | 5/2010 | Watanabe | ............ | G06V 40/23 340/5.83 |
| 2013/0047217 A1 * | 2/2013 | Shuster | ............ | G06F 40/14 726/4 |
| 2013/0063401 A1 | 3/2013 | Ouchida | | |
| 2014/0079297 A1 * | 3/2014 | Tadayon | ............ | G06V 40/172 382/118 |
| 2014/0201126 A1 * | 7/2014 | Zadeh | ............ | A61B 5/165 706/52 |
| 2015/0022660 A1 * | 1/2015 | Kavadeles | ............ | G06V 20/52 348/143 |
| 2015/0227210 A1 * | 8/2015 | Chen | ............ | G06F 3/0346 345/156 |
| 2015/0310497 A1 * | 10/2015 | Valin | ............ | G06Q 99/00 705/14.66 |
| 2018/0060639 A1 * | 3/2018 | Lee | ............ | G06V 40/13 |
| 2018/0276489 A1 * | 9/2018 | Xu | ............ | G06V 40/167 |
| 2018/0341836 A1 * | 11/2018 | Lim | ............ | G06T 7/0002 |
| 2019/0340442 A1 * | 11/2019 | Kavadeles | ............ | G06V 20/52 |
| 2020/0300970 A1 * | 9/2020 | Nguyen | ............ | G06V 10/764 |
| 2020/0342259 A1 * | 10/2020 | Jordan | ............ | G06V 20/95 |
| 2021/0110615 A1 * | 4/2021 | Zhao | ............ | G06T 7/73 |
| 2022/0130120 A1 * | 4/2022 | Zhao | ............ | G06F 3/011 |

FOREIGN PATENT DOCUMENTS

| | | |
|---|---|---|
| EP | 2571257 A1 | 3/2013 |
| JP | 2005-250233 A | 9/2005 |
| JP | 2006-123161 A | 5/2006 |
| JP | 2007-155985 A | 6/2007 |
| JP | 2007-276080 A | 10/2007 |
| JP | 2013-061552 A | 4/2013 |
| KR | 10-2006-0029043 A | 4/2006 |

* cited by examiner

INFORMATION PROCESSING APPARATUS AND METHOD FOR PROCESSING INFORMATION

CROSS REFERENCE TO RELATED APPLICATIONS

This application is a U.S. National Phase of International Patent Application No. PCT/JP2019/034802 filed on Sep. 4, 2019, which claims priority benefit of Japanese Patent Application No. JP 2018-228928 filed in the Japan Patent Office on Dec. 6, 2018. Each of the above-referenced applications is hereby incorporated herein by reference in its entirety.

TECHNICAL FIELD

The present disclosure relates to an information processing apparatus, a method for processing information, and a program.

BACKGROUND ART

A robot device that recognizes a person and interacts with the recognized person has been described. For example, Patent Document 1 set out below discloses a guide robot that detects presence and a position of a person from an image obtained by a stereo camera and interacts with the detected person.

CITATION LIST

Patent Document

Patent Document 1: Japanese Patent Application Laid-Open No. 2007-276080

SUMMARY OF THE INVENTION

Problems to be Solved by the Invention

In the technique disclosed in Patent Document 1, all people included in the image obtained by the guide robot have been premised to be real people. Under such a premise, there has been a risk that the robot device inappropriately operates.

The present disclosure has been conceived in view of the points described above, and it is an object of the present disclosure to provide an information processing apparatus, a method for processing information, and a program that determine reality of an object and perform control based on a result of the determination.

Solutions to Problems

For example, the present disclosure is directed to:
an information processing apparatus including:
a reality determiner that determines whether an object detected on the basis of sensing data is a real object or an unreal object; and
a controller that performs predetermined control on the basis of a result of the determination made by the reality determiner.

For example, the present disclosure is directed to:
a method for processing information, the method including:
determining, using a reality determiner, whether an object detected on the basis of sensing data is a real object or an unreal object; and
performing, using a controller, predetermined control on the basis of a result of the determination made by the reality determiner.

For example, the present disclosure is directed to:
a program causing a computer to execute a method for processing information including:
determining, using a reality determiner, whether an object detected on the basis of sensing data is a real object or an unreal object; and
performing, using a controller, predetermined control on the basis of a result of the determination made by the reality determiner.

MODE FOR CARRYING OUT THE INVENTION

Hereinafter, an embodiment and the like of the present disclosure will be described with reference to the accompanying drawings. Note that descriptions will be given in the following order.
<Background>
<Embodiment>
<Variations>

The embodiment and the like to be described below are preferred specific examples of the present disclosure, and the contents of the present disclosure are not limited to those embodiment and the like.

<Background>

Figure 1:
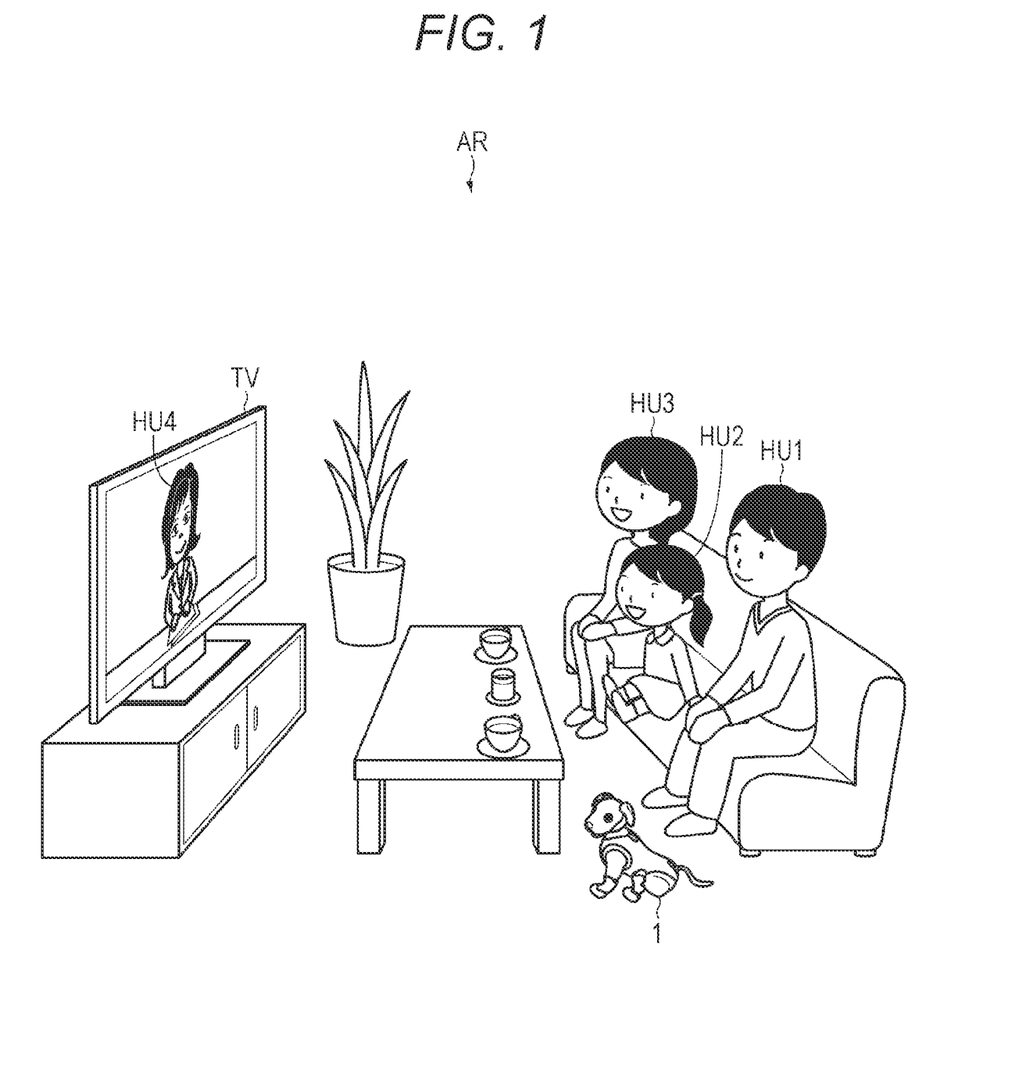
FIG. 1 is a diagram to be referred to when explaining the background of the present disclosure.

First, the background of the present disclosure will be described to facilitate the understanding of the present disclosure. As illustrated in FIG. 1, a certain space (living room AR as a specific example) will be considered. In the living room AR, three people, which are HU1 to HU3, are sitting on the sofa and watching a television broadcast. In the present example, the three people HU1 to HU3 are assumed to be a father, a mother, and a child. A newscaster HU4 is displayed on the screen of the television device TV on which video of the television broadcast is reproduced. In the living room AR, there is a self-propelled dog robot (robot device 1) that is an exemplary information processing apparatus.

The robot device 1 includes a camera, for example, and detects a person included in an image obtained by the camera. In a case where a person is detected, the robot device 1 approaches the person and makes a charming gesture such as raising a hand, sitting on the lap, and the like. Here, in a case where the newscaster HU4 is detected as a person, the robot device 1 approaches the newscaster HU4 or extends a hand, for example, when control is performed on the premise that all people included in the image are real as in the technique disclosed in Patent Document 1 described above. In view of the above, the robot device 1 can operate appropriately by determining whether the object recognized by the robot device 1 is real or unreal and performing control based on a result of the determination. Taking the above points into consideration, the embodiment of the present disclosure will be detailed.

Note that, although the object displayed on the television device TV (specifically, newscaster HU4) has been described as an exemplary unreal object in the example above, not all objects to be displayed on the display screen are unreal objects. For example, a person who has been recognized by the robot device 1 (specifically, the owner of the robot device 1) displayed on the display screen can be determined as a real object.

<Embodiment>

[Exemplary Appearance of Robot Device]

Figure 2:
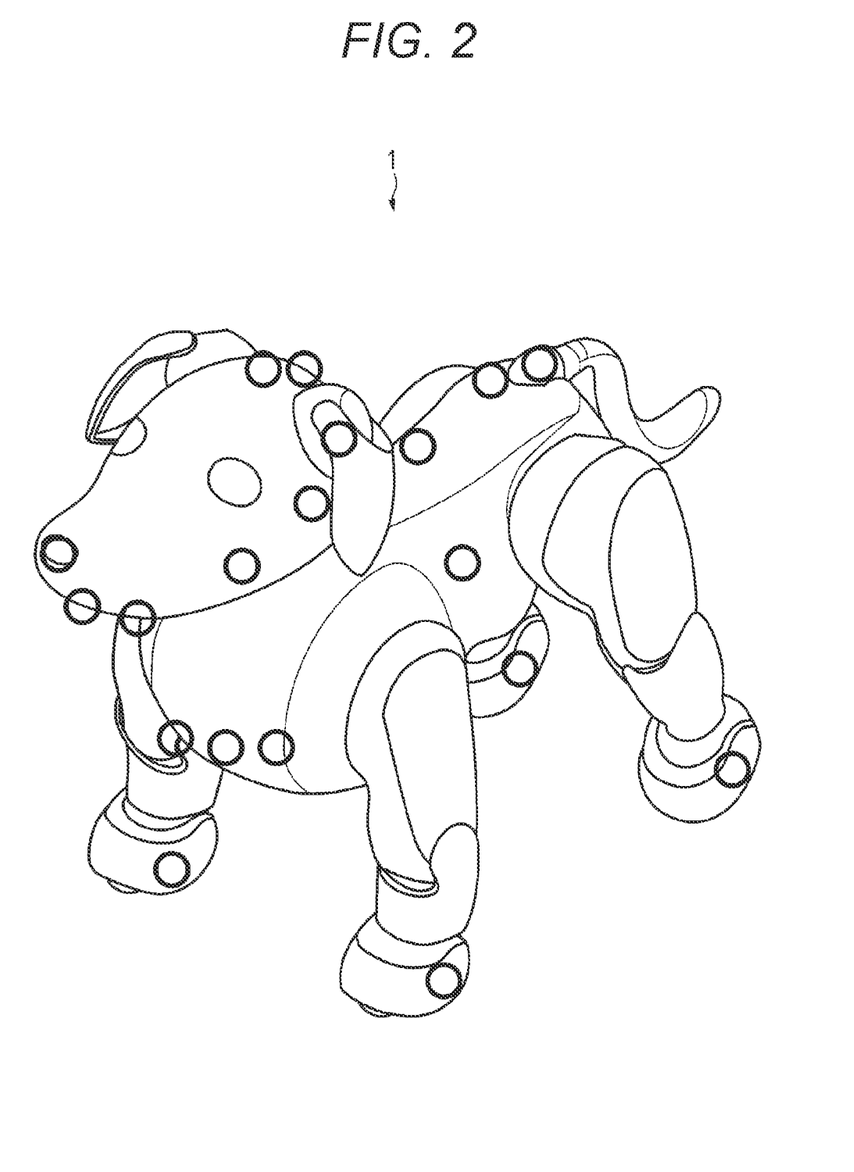
FIG. 2 is a perspective view illustrating an exemplary appearance of a robot device according to an embodiment.

As illustrated in FIG. 2, a self-propelled dog robot device 1 will be described as an exemplary information processing apparatus in an embodiment of the present disclosure. It is needless to say that the present disclosure can also be applied to robots of other shapes and various agent devices called smart speakers.

An electric motor, such as a servomotor, is incorporated at an appropriate position, such as a joint, inside the robot device 1. The electric motor operates to appropriately drive the four legs of the robot device 1, and the robot device 1 walks, runs, or extends a hand. Furthermore, the robot device 1 is configured to be capable of performing optional operations (actions), such as wagging the tail, sticking out the tongue, and pricking up the ears, by a drive mechanism such as the electric motor operating.

Furthermore, the robot device 1 includes various sensors. Examples of the sensors include a microphone, a camera, a time of flight (ToF) sensor, a motion sensor, a position sensitive detector (PSD) sensor, a touch sensor, an illuminance sensor, a sole button, an inertial sensor, a contact surface sensor, an infrared sensor, and an ultrasonic sensor. Those sensors are provided at appropriate points (e.g., points marked with circles in FIG. 2) of the robot device 1.

[Exemplary Internal Configuration of Robot Device]

Figure 3:
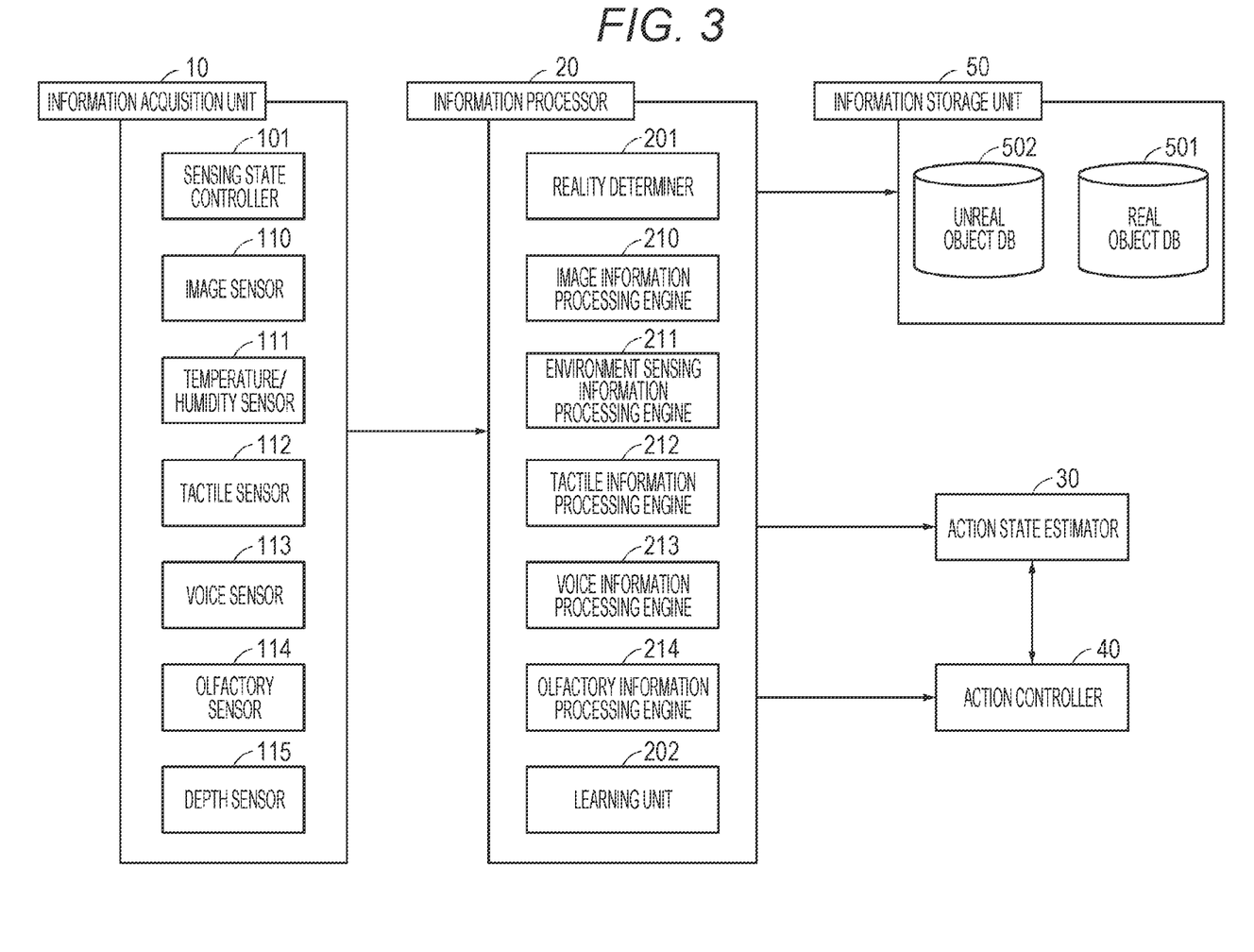
FIG. 3 is a block diagram illustrating an exemplary internal configuration of the robot device according to the embodiment.

FIG. 3 is a block diagram illustrating an exemplary internal configuration of the robot device 1. The robot device 1 includes an information acquisition unit 10, an information processor 20, an action state estimator 30, an action controller 40, and an information storage unit 50.

(Information Acquisition Unit)

The information acquisition unit 10 includes a plurality of sensors, and a sensing state controller 101 serving as a sensor controller that controls on/off of each sensor on the basis of a determination result of determining reality of an object. While examples of the sensors have been described above, in the following descriptions, an image sensor 110, a temperature/humidity sensor 111, a tactile sensor 112, a voice sensor 113, an olfactory sensor 114, and a depth sensor 115 will be described as specific examples of the sensors.

The image sensor includes a charge coupled device (CCD), a complementary metal oxide semiconductor (CMOS), and the like, and performs photoelectric conversion on light from a subject to obtain image data, which is one of sensing data. The temperature/humidity sensor 111 measures a temperature and humidity around the robot device 1. The tactile sensor 112 detects that the robot device 1 has come into contact with some kind of object. The voice sensor 113 includes a microphone and the like, and detects a sound around the robot device 1. The olfactory sensor 114 detects a smell around the robot device 1. The depth sensor 115 includes a ToF sensor, a stereo camera, and the like, and measures a distance to a target object.

Note that, although illustration is omitted, the information acquisition unit 10 may include a communication unit for obtaining information from an external device connected to a network. The communication may be wired communication, or may be wireless communication. Examples of the wireless communication include a local area network (LAN), Bluetooth (registered trademark), Wi-Fi (registered trademark), and wireless universal serial bus (WUSB).

(Information Processor)

The information processor 20 includes a configuration for processing sensing data obtained by the information acquisition unit 10. Specifically, the information processor 20 includes an image information processing engine 210 that processes sensing data obtained by the image sensor 110 and the depth sensor 115, an environment sensing information processing engine 211 that processes sensing data obtained by the temperature/humidity sensor 111, a tactile information processing engine 212 that processes sensing data obtained by the tactile sensor 112, a voice information processing engine 213 that processes sensing data obtained by the voice sensor 113, and an olfactory information processing engine 214 that processes sensing data obtained by the olfactory sensor 114.

Here, the image information processing engine 210 performs publicly known image processing on image data, and also functions as an object detector that detects an object included in the image data that is one of the sensing data. The object is a predetermined object (including an object displayed on a display screen and an object in a mirror or a window) located in space, and a person will be described as an example in the present embodiment.

The information processor 20 further includes a reality determiner 201. The reality determiner 201 determines whether the object detected by the image information processing engine 210 is a real object or an unreal object. In a case where the image information processing engine 210 has detected multiple objects, the reality determiner 201 determines, for each individual object, whether the object is a real object or an unreal object. Note that, in the present specification, determining whether the object is a real object or an unreal object is appropriately referred to as determining reality.

In the present embodiment, a real object indicates an object capable of interacting with the robot device 1, and an unreal object indicates an object not capable of interacting with the robot device 1. On the basis of the viewpoint mentioned above, for example, a person present in the same space as the robot device 1 is determined to be a real object because the robot device 1 can interact with the person such as extending a hand. Furthermore, a person included in a television broadcast or a person in a mirror does not respond even if the robot device 1 takes actions such as extending a hand to the person, in other words, the person cannot interact, thereby being determined to be an unreal object.

Note that definitions of the real object and the unreal object may be changed depending on the usage, operating environment, and the like of the robot device 1. For example, in a case where remote control of the robot device 1 is not considered, a three-dimensional object present in the same space as the robot device 1 may be determined to be a real object, and other objects may be determined to be unreal objects. On the basis of the viewpoint mentioned above, for example, a glass present in the same space as the robot device 1 is determined to be a real object, and a glass present in a book is determined to be an unreal object even if it is present in the same space. Furthermore, a person on a balcony is determined to be an unreal object because the robot device 1 sees the person through window glass, and a person having entered the room is determined to be a real object.

Furthermore, an object that can be sensed by specific sensors may be determined to be a real object, and an object that can be sensed by only some sensors may be determined to be an unreal object. On the basis of the viewpoint mentioned above, for example, a person in the real world in the same space as the robot device 1 can be sensed by all sensors, such as the image sensor 110, thereby being determined to be a real object. Furthermore, a person in a television broadcast can be sensed by only the image sensor 110 and the voice sensor 113, in other words, it can be sensed by only some sensors, thereby being determined to be an unreal object.

The information processor 20 further includes a learning unit 202. The learning unit 202 performs learning on the basis of sensing data (e.g., image data). Examples of problem settings for machine learning include supervised learning, unsupervised learning, semi-supervised learning, reinforcement learning, inverse reinforcement learning, active learning, and transfer learning. The learning unit 202 performs learning based on those publicly known learning methods. A result of the learning is reflected in, for example, the reality determination process performed by the reality determiner 201.

(Action State Estimator)

The action state estimator 30 recognizes its own action state of the robot device 1 in real time, and determines whether or not a series of actions set by the action controller 40 has been complete, for example. The action state estimator 30 recognizes its own action state in real time on the basis of operation histories of the electric motor or the like provided at a joint or the like, for example. In a case where the action state estimator 30 determines that the action has been complete, the reality determiner 201 again performs reality of an object included in image data to be input next. In a case where the action state estimator 30 determines that the action has not been complete, the action control and the like by the action controller 40 continues while the latest reality determination result is maintained.

(Action Controller)

The action controller 40 determines an action of the robot device 1 with respect to the detected object on the basis of the determination result of the reality determiner 201. The action controller 40 includes, for example, a central processing unit (CPU) and the like. The action controller 40 operates a drive mechanism, such as an electric motor and an actuator of the robot device 1, in such a manner that the robot device 1 performs the determined action. For example, in a case where an object is determined to be a real object, the robot device 1 can interact with the object, whereby the action controller 40 executes control to cause the robot device 1 to perform some kind of action (e.g., operation of extending a hand or wagging the tail) on the object. On the other hand, in a case where an object is determined to be an unreal object, the robot device 1 cannot interact with the object, whereby the action controller 40 executes control to cause the robot device 1 to produce no reaction to the object.

As described above, in the present embodiment, at least one of the sensing state controller 101 or the action controller 40 corresponds to the controller that performs predetermined control on the basis of the determination result of the reality determiner 201.

(Information Storage Unit)

The information storage unit 50 is a database (DB) that accumulates (stores) various kinds of information. Examples of the information storage unit 50 include a magnetic storage device such as a hard disk drive (HDD), a semiconductor storage device, an optical storage device, and a magneto-optical storage device. The information storage unit 50 may include a portable memory that can be attached to and detached from the robot device 1. The information storage unit 50 in the present embodiment includes a real object database 501 that accumulates, in a case where an object is determined to be a real object, information associated with the object, and an unreal object database 502 that accumulates, in a case where an object is determined to be an unreal object, information associated with the object.

[Exemplary Action Control by Action Controller]

Next, exemplary action control by the action controller 40 will be described. In a case where at least one person among the persons included in the image data is determined to be a real object as a result of the determination made by the reality determiner 201, the action controller 40 performs control in such a manner the robot device 1 acts in a predetermined mode (hereinafter referred to as active mode). Furthermore, in a case where all the persons included in the image data is determined to be unreal objects as a result of the determination made by the reality determiner 201, the action controller 40 performs control in such a manner the robot device 1 acts in another mode (hereinafter referred to as passive mode).

(Exemplary Action of Robot Device Based on Active Mode)

As an exemplary action of the robot device 1 based on the active mode, since an object to be recognized is a real object, an active action of the robot device 1 is assumed. Specifically, the following exemplary actions can be considered.

"First Exemplary Action"

The robot device 1 spontaneously speaks to a person determined to be a real object. When speaking, the robot device 1 turns its face toward the person, and tries to communicate with the person.

"Second Exemplary Action"

The robot device 1 performs an action to attract attention of the person determined to be a real object (to call attention to the robot device 1). For example, the robot device 1 cries "bowwow".

"Third Exemplary Action"

The robot device 1 makes physical contact with the person determined to be a real object. Specifically, the robot device 1 performs an attendant motion of sitting near the person or on the person's lap. Furthermore, it also makes a motion of high five, handshake, gripping, touching, chewing, licking, and the like.

"Fourth Exemplary Action"

In a case where an abnormality occurs in the person determined to be a real object, it operates to notify another person of the fact. For example, the robot device 1 sounds an alarm, or transmits the abnormality occurrence to a security system on the network. Note that, in a case where the person is determined to be an unreal object (e.g., the person is a character in a drama in which the person is displayed on a television device), the robot device 1 does not operate to make abnormality notification or the like even if an abnormality occurs in the person.

"Fifth Exemplary Action"

The robot device 1 operates to play with the person determined to be a real object. For example, the robot device 1 chews on a ball thrown by the person determined to be a real object and brings it back.

"Sixth Exemplary Action"

The robot device 1 may be designed with a person as an audience or a spectator. In such a case, the robot device 1 makes a motion of acting, a performance, or the like for the person determined to be a real object. As a specific example, the robot device 1 makes a motion of dancing to a tune for the person determined to be a real object.

Figure 4:
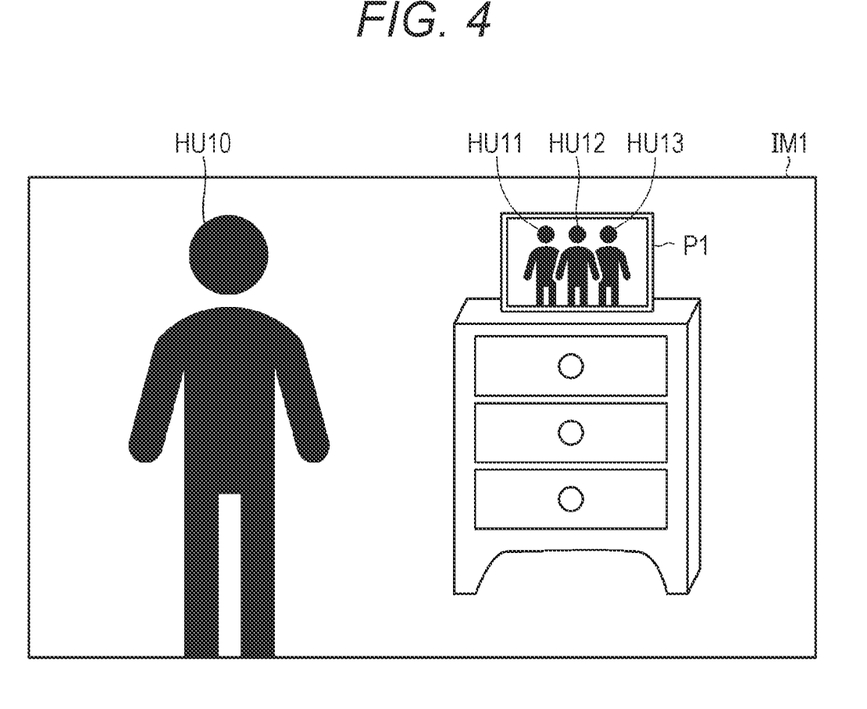
FIG. 4 is a diagram for explaining a specific example of a case where objects determined to be real objects or unreal objects are mixedly present.

Note that, in a case where the image data obtained by the image sensor 110 includes a plurality of persons, some of the plurality of persons may be determined to be real objects, and other persons may be determined to be unreal objects. As a specific example, as schematically illustrated in FIG. 4, a case where image data IM1 shows an actual person HU10 and persons (persons HU11 to HU13) in a photograph P1 leaning next to the person will be considered. According to the process of determining reality performed by the reality determiner 201, the person HU10 is determined to be a real object, and the persons HU11 to HU13 in the photograph are determined to be unreal objects.

In this manner, in a case where objects determined to be a real object or an unreal object are mixedly present, the action controller 40 determines an action showing interest in the unreal object, for example. More specifically, the action controller 40 obtains information associated with the unreal object through interaction, and determines the action of learning.

As a specific example of the action, the robot device 1 turns its face toward the unreal object (direction of the photograph), and blinks. Furthermore, the robot device 1 approaches the unreal object, turns its tail or head, barks at the unreal object, and obtains information associated with the unreal object through interaction. Furthermore, in a case where the robot device 1 is provided with a light indicating that the robot device 1 is interested, the light is turned on, blinked, or the like.

Figure 5:
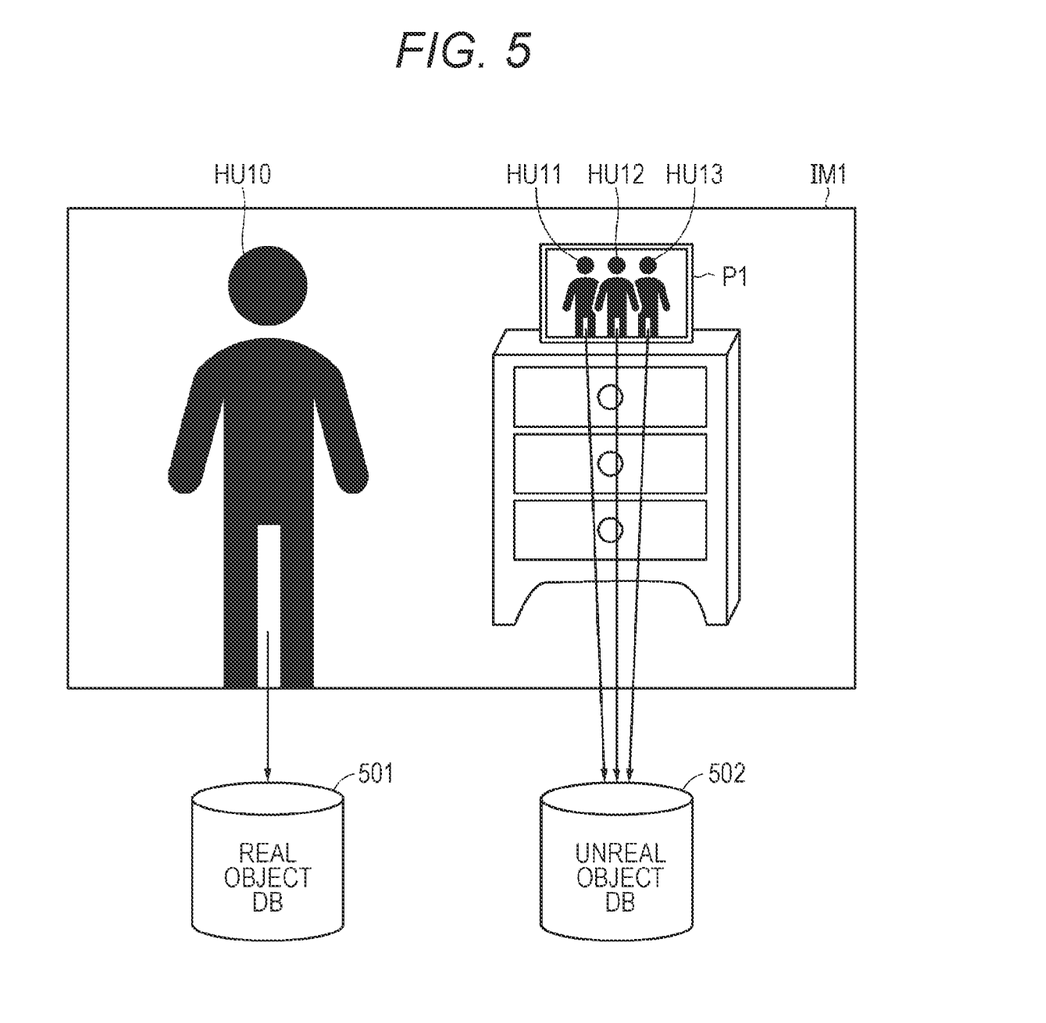
FIG. 5 is a diagram illustrating that sensing data related to real objects and sensing data related to unreal objects are stored in a database.

Note that, as illustrated in FIG. 5, sensing data related to the person HU10 that is a real object is accumulated in the real object database 501, and sensing data related to the persons HU11 to HU13 that are unreal objects is accumulated in the unreal object database 502.

(Exemplary Action of Robot Device Based on Passive Mode)

As an exemplary action of the robot device 1 based on the passive mode, since all the recognized objects are unreal objects, the robot device 1 basically produces no reaction. However, the action based on the passive mode is not limited to no reaction. For example, even in a case where the robot device 1 recognizes that the person is an unreal object, it intentionally approaches the person and takes some kind of action. Since the person is an unreal object (e.g., newscaster or actor appearing on a television broadcast), the unreal object does not react to the action of the robot device 1. At that time, the robot device 1 makes a motion of tilting its head. The cuteness of the robot device 1 can be enhanced with such a motion to the unreal object.

As exemplified above, the action controller 40 determines the action based on the determination result of the reality of the object.

[Exemplary Sensor Control by Sensing State Controller]

Next, exemplary sensor control by the sensing state controller 101 will be described. The sensing state controller 101 controls on/off of each sensor according to the result of the determination made by the reality determiner 201.

Figure 6:
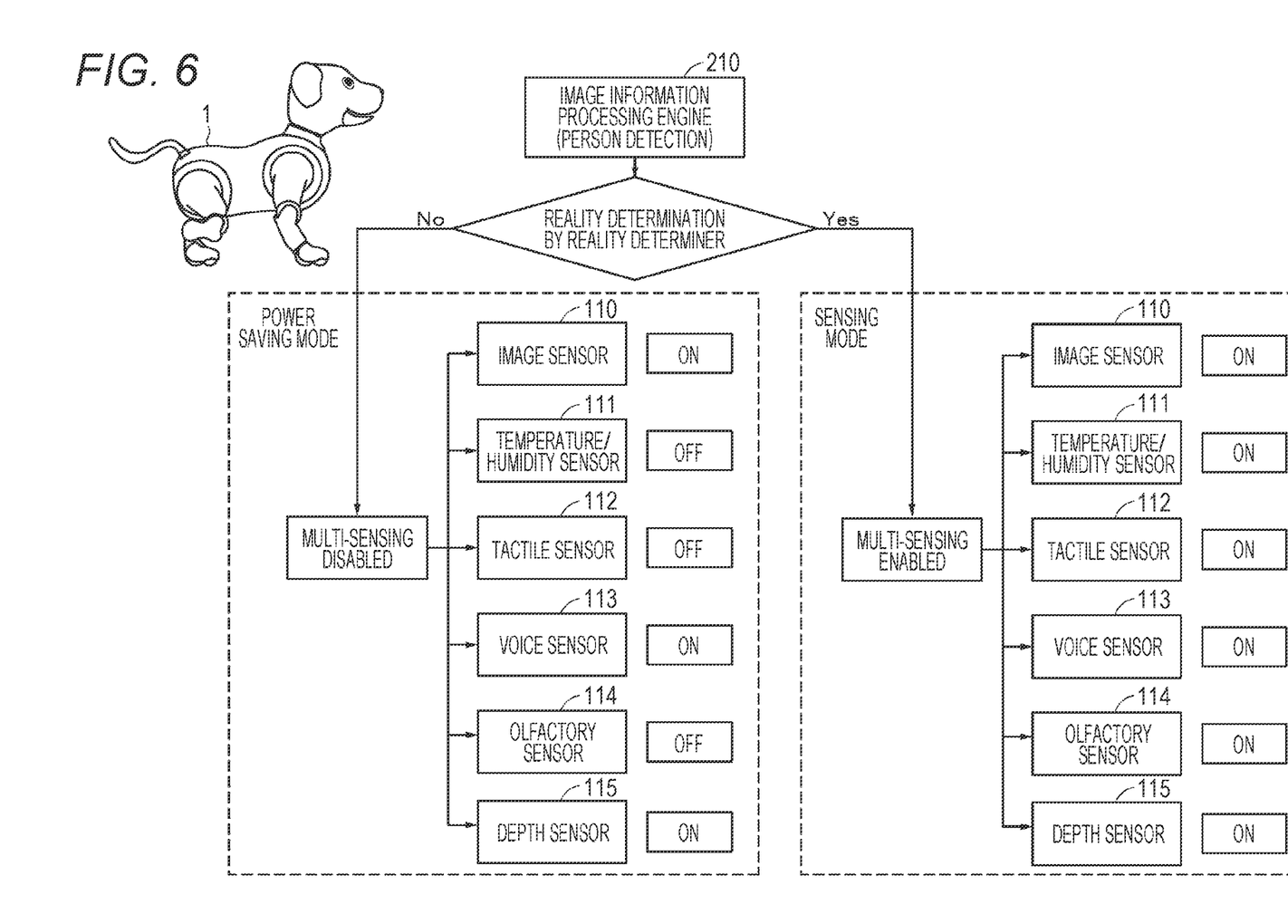
FIG. 6 is a diagram for explaining exemplary sensor control by a sensing state controller according to the embodiment.

FIG. 6 is a diagram for explaining exemplary sensor control by the sensing state controller 101. The image information processing engine 210 detects a person as an exemplary object. Then, the reality determiner 201 determines reality of the object. In a case where the object is a real object (in a case where at least one of the multiple objects is a real object) as a result of the determination, the sensing state controller 101 controls each sensor on the basis of a sensing mode that enables multi-sensing. Furthermore, in a case where all the objects are unreal objects (in a case where no real object is included) as a result of the determination, the sensing state controller 101 disables multi-sensing, and controls each sensor on the basis of a power saving mode.

In a case where the detected objects include a real object, the robot device 1 makes an active motion on the basis of the active mode as described above. Furthermore, even in a case where an unreal object is included in a plurality of objects, it is necessary to obtain information associated with the unreal object through image recognition or interaction. In view of the above, in the sensing mode, the sensing state controller 101 performs sensor control of turning all sensors on, for example (see FIG. 6).

Note that each sensor that operates on the basis of the sensing mode obtains sensing data related to the real object. In some cases, it also obtains sensing data related to the unreal object. The sensing data related to the real object is stored in the real object database 501, and the sensing data related to the unreal object is stored in the unreal object database 502.

In a case where the detected objects do not include a real object, the robot device 1 does not positively make an active motion. In view of the above, in the power saving mode, the sensing state controller 101 performs sensor control of turning on the minimum necessary sensors, for example. The minimum necessary sensors indicate, for example, sensors for detecting an object to be input subsequently, and specific examples thereof include sensors including at least the image sensor 110. In the present embodiment, in the power saving mode, the image sensor 110, the voice sensor 113, and the depth sensor 115 are turned on (see FIG. 6). According to such sensor control, power consumption in the robot device 1 can be reduced. Note that the sensing data related to the unreal object is stored in the unreal object database 502.

Note that, as described above, even in a case where the detected object is an unreal object, the robot device 1 may intentionally make a motion of approaching the unreal object, for example. Accordingly, the sensing state controller 101 may control each sensor on the basis of the sensing mode during the period of such operation.

Table 1 set out below summarizes examples of the control by the action controller 40 and the sensor control by the sensing state controller 101 described above.

TABLE 1

| REALITY DETERMINATION | SENSING STATE CONTROL | INFORMATION STORAGE | ACTION CONTROL |
|---|---|---|---|
| ONLY REAL OBJECT IS PRESENT IN IMAGE DATA | MULTI-SENSING | REAL DB | ACTIVE MODE |
| REAL OBJECT AND UNREAL OBJECT ARE MIXEDLY PRESENT IN IMAGE DATA | MULTI-SENSING | REAL DB UNREAL DB | ACTIVE MODE |
| ONLY UNREAL OBJECT IS PRESENT IN IMAGE DATA | POWER SAVING MODE (ONLY IMAGE SENSOR, VOICE SENSOR, AND DEPTH SENSOR ARE ENABLED) | UNREAL DB | PASSIVE MODE |

[Process Flow]

(Overall Process Flow)

Next, a main process flow performed by the robot device 1 according to the embodiment will be described. First, an overall process flow performed by the robot device 1 according to the embodiment will be described with reference to the flowchart of FIG. 7.

Figure 7:
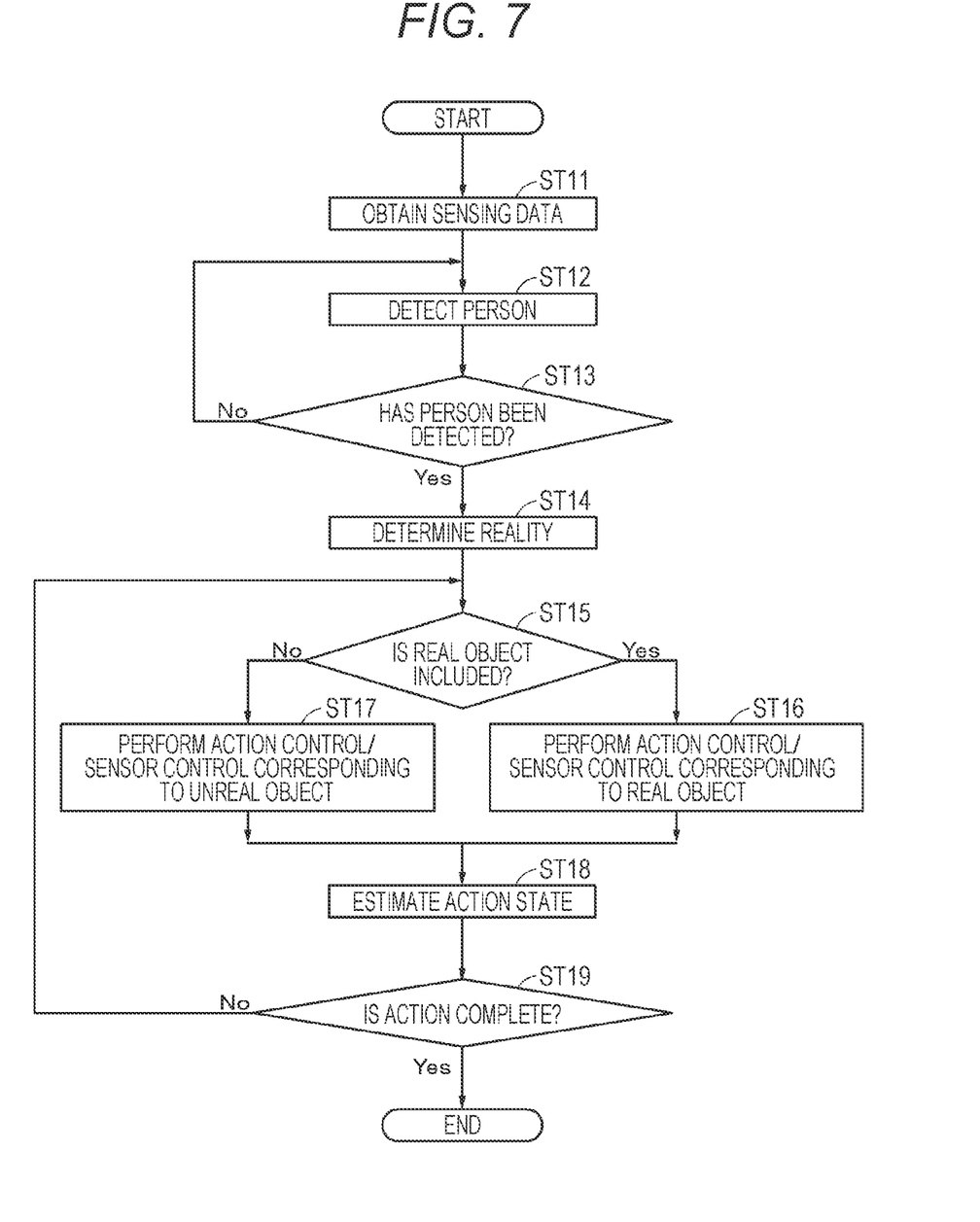
FIG. 7 is a flowchart for explaining an overall flow of a process performed by the robot device according to the embodiment.

When the process starts, in step ST11, each sensor of the information acquisition unit 10 operates to obtain sensing data. For example, the image sensor 110 obtains image data, which is one of the sensing data. Then, the process proceeds to step ST12.

In step ST12, the information processor 20 operates to process each sensing data. For example, the image data obtained by the image sensor 110 is supplied to the image information processing engine 210. The image information processing engine 210 detects whether or not the image data includes a person as an exemplary object. Then, the process proceeds to step ST13.

In step ST13, it is determined whether or not a person has been detected. In a case where no person is detected in the image data as a result of the determination processing, the process returns to step ST12. In a case where a person is detected in the image data, the process proceeds to step ST14.

In step ST14, the reality determiner 201 determines reality of the object. Then, the process proceeds to step ST15.

In step ST15, for example, the reality determiner 201 determines whether or not a real object is included as a result of the determination processing by the reality determiner 201. The reality determiner 201 outputs the determination result to the action controller 40 and the sensing state controller 101. In a case where a real object is included as a result of the determination processing in step ST15, the process proceeds to step ST16.

In step ST16, action control and sensor control corresponding to the real object are performed. The action control is, for example, action control based on the active mode. The sensor control is, for example, sensor control based on the sensing mode. Specific examples of the action control based on the active mode and the sensor control based on the sensing mode are as described above. When the processing of step ST16 is complete, the process proceeds to step ST18.

In a case where no real object is included as a result of the determination processing in step ST15, the process proceeds to step ST17. In step ST17, action control and sensor control corresponding to the unreal object are performed. The action control is, for example, action control based on the passive mode. The sensor control is, for example, sensor control based on the power saving mode. Specific examples of the action control based on the passive mode and the sensor control based on the power saving mode are as described above. When the processing of step ST17 is complete, the process proceeds to step ST18.

In step ST18, the action state estimator 30 performs an action state estimation processing. Then, the process proceeds to step ST19.

In step ST19, it is determined whether or not a series of actions based on the action control by the action controller 40 is complete as a result of the action state estimation processing. In a case where the series of actions is determined to be complete, the process is terminated, and a similar process is performed on sensing data obtained thereafter.

In a case where the series of actions is determined not to be complete as a result of the determination processing of step ST19, the process returns to step ST15. Note that, in this case, the previous determination result of the reality determination is shared and retained in the entire system, and the action control and the sensor control using the retained reality determination result are performed.

Note that, in the determination processing of step ST15, an object determined to be a real object and an object determined to be an unreal object may be mixedly present in the image data. In such a case, for example, the process illustrated in the flowchart of FIG. 8 is performed.

Figure 8:
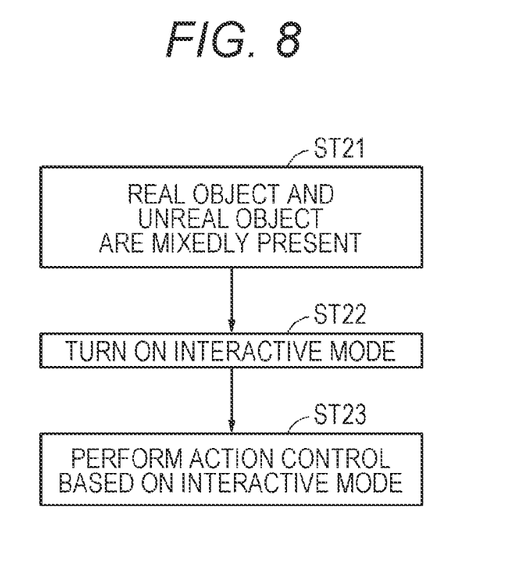
FIG. 8 is a flowchart for explaining exemplary control performed by an action controller according to the embodiment in a case where objects determined to be real objects or unreal objects are mixedly present.

In step ST21 of FIG. 8, as a result of the reality determination made on the object, it is determined that a real object and an unreal object are mixedly present (exist) in the image data. The determination result is supplied to the action controller 40. Then, the process proceeds to step ST22.

In step ST22, for example, the action controller 40 turns on an interactive mode, and controls the robot device 1 to make a motion based on the interactive mode. The interactive mode is a mode in which the robot device 1 interacts with the real object to obtain information associated with the unreal object. Then, the process proceeds to step ST23.

In step ST23, the action controller 40 performs action control based on the interactive mode, and the robot device 1 operates on the basis of the action control. Specific examples of the action may include utterance for obtaining information associated with the unreal object, in addition to the above-described actions showing interest in the unreal object. The following is an example of the interaction performed between a person determined to be a real object (e.g., person HU10 in FIG. 4) and the robot device 1.

Robot device 1: "Who is the person in the picture?"

Person HU10: "Which person?"

Robot device 1: "(looking in the direction of person HU11) The person I am looking at now."

Person HU10: "(looking at the line-of-sight of the robot device 1) Oh, that photo, that's my friend."

Robot device 1: "What is the person's name?"

Person HU10: "It's Nana."

Figure 9:
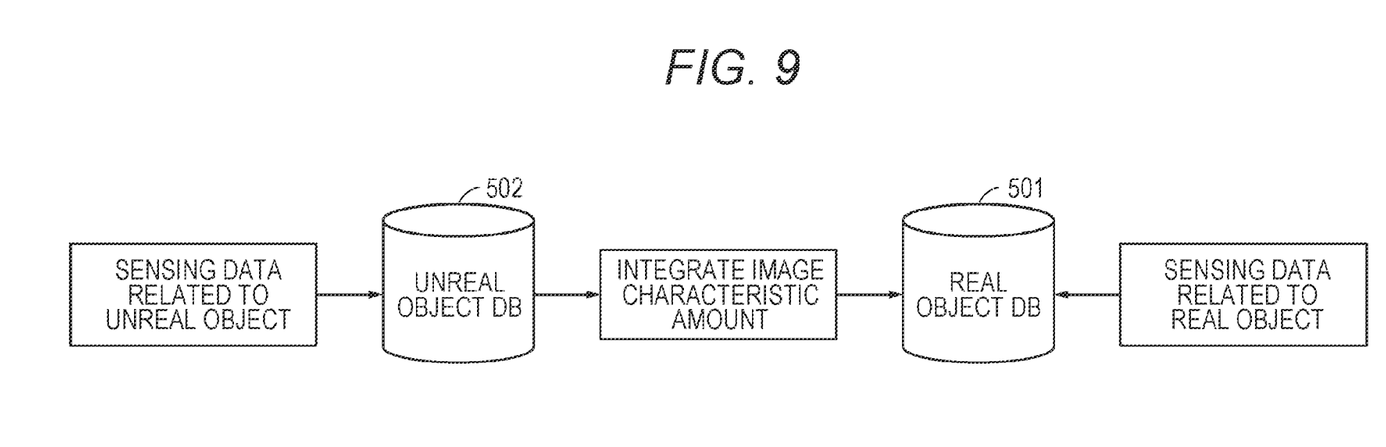
FIG. 9 is a diagram illustrating that sensing data related to real objects and sensing data related to unreal objects are stored in a database.

Through such interaction, the robot device 1 obtains information associated with the unreal object. As illustrated in FIG. 9, the unreal object obtained by the sensor and the interaction is stored in the unreal object database 502. As a specific example, the image of the person HU11 obtained by the image sensor 110 is associated with the name of the person HU11 obtained through the interaction, and is stored in the unreal object database 502. Furthermore, since sensing data by each sensor is obtained also for the person HU10, which is a real object, the obtained sensing data is stored in the real object database 501.

Note that, as illustrated in FIG. 9, the characteristic amount stored in the real object database 501 and the characteristic amount stored in the unreal object database 502 may be integrated. For example, information that the person HU11 is a friend of the person HU10 and the name is Nana is associated with the characteristic amount of the person HU10. The characteristic amount (e.g., image information) stored in the unreal object database 502 may be a person drawn on a poster or the like whom the person HU10 is a fan of. In such a case, information of the person whom the person HU10 is a fan of (characteristics of the facial image, gender, age, etc.) is associated with the characteristic amount of the person HU10. Furthermore, the learning unit 202 of the robot device 1 learns the characteristic amount accumulated in the unreal object database 502, whereby the robot device 1 can learn, for example, the preference and the like of the person HU10.

(Reality Determination Process Flow)

Figure 10:
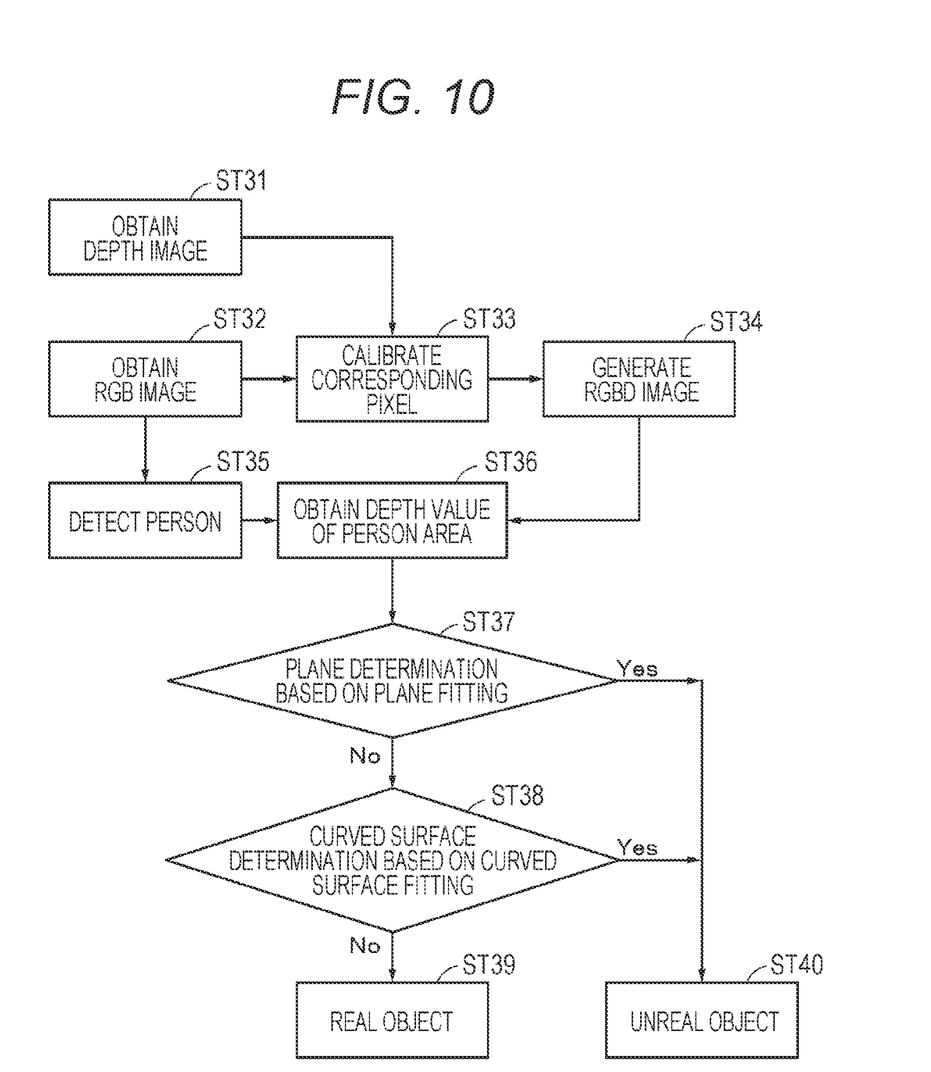
FIG. 10 is a flowchart for explaining a process of determining reality of an object.

Next, a process flow of determining reality of an object will be described with reference to the flowchart illustrated in FIG. 10. Note that the process to be described below is performed by, for example, the image information processing engine 210 and the reality determiner 201.

In step ST31, the depth sensor 115 obtains a depth image. Furthermore, in parallel with the processing of step ST31, the image sensor 110 obtains a red/green/blue (RGB) image in step ST32. Then, the process proceeds to step ST33.

In step ST33, corresponding pixel calibration processing for aligning the depth image and the RGB image is performed. Then, the process proceeds to step ST34. In step ST34, an RGBD image including RGB information and depth information is generated by the corresponding pixel calibration processing of step ST33.

Meanwhile, in the processing of step ST35, person detection processing of detecting a person on the basis of the RGB image obtained in step ST32 is performed. Then, the process proceeds to step ST36. In step ST36, a depth value of a person area is obtained on the basis of the result of the person detection processing and the RGBD image. Then, the process proceeds to step ST37.

In step ST37, it is determined whether or not the person fits on a predetermined plane by plane fitting processing. In a case where the result of the determination processing is affirmative determination, it is highly likely that the person is a person displayed on a screen of a television device, that is, a plane. Therefore, in a case where the result of step ST37 is affirmative determination, the process proceeds to step ST40, and the person included in the image data is determined to be an unreal object.

In a case where the result of the determination processing in step ST37 is negative determination, the process proceeds to step ST38. In step ST38, it is determined whether or not the person fits on a predetermined curved surface by curved surface fitting processing. In recent years, curved displays have also become widespread. In view of the above, by performing the processing of step ST38, it becomes possible to suppress the situation where a person displayed on a curved display is determined to be a real object. In a case where the result of step ST38 is affirmative determination, the person included in the image data is determined to be a person displayed on a curved display or the like, and the process proceeds to step ST40. Then, the person included in the image data is determined to be an unreal object.

In a case where the result of step ST38 is negative determination, the process proceeds to step ST39, and the person included in the image data is determined to be a real object.

Note that the process described above is an example of the process of determining the reality of the object, and the reality of the object may be determined by another process. For example, a polarizing filter is provided in front of the image sensor 110. A mirror area is obtained on the basis of the image obtained through the polarizing filter. The mirror area is to be an area where a polarization degree (Brewster angle or polarization angle) is close to one due to specular reflection. The obtained mirror area is mapped to the RGB image. A person present in the mirror area is grasped as a person through glass such as a mirror, a liquid crystal screen, or a window, and the person may be determined as an unreal object since it is impossible to interact with the person or it is difficult to interact with the person. Furthermore, information associated with a person (e.g., owner (keeper) of the robot device 1) may be accumulated in the information storage unit 50, and it may be determined as a real object even if the person fits on a flat surface or a curved surface as long as the person matches the person information accumulated in the information storage unit 50. This makes it possible to suppress the situation where, at the time of performing interaction between the person and the robot device 1 at a remote location, the person displayed on the screen is determined to be an unreal object. Those methods of determination may be combined to determine the reality of the object.

<Variations>

Although the plurality of embodiments of the present disclosure has been specifically described above, the contents of the present disclosure are not limited to the embodiments described above, and various modifications based on the technical idea of the present disclosure can be made. Hereinafter, variations will be described.

Although the object has been described to be a person in the embodiment described above, it may be an animal other than the person. For example, it may be a cat. In a case where the cat is a real object, sensing data such as an appearance, a temperature and humidity, softness, a sound, and a smell is obtained on the basis of a plurality of sensors, and the obtained sensing data is saved in the real object database 501. In a case where the cat is an unreal object, for example, only vision information obtained through the image sensor 110 is saved in the unreal object database 502. The characteristic amounts saved in the real object database 501 and the unreal object database 502 may be integrated so that the learning unit 202 learns about the object (cat). Note that the object may be something other than a living being.

The robot device 1 may include a sensor other than the sensors described above. For example, the robot device 1 may include a sensor for obtaining biological information (body temperature, pulse, etc.) of a person. For example, the robot device 1 bites a person's fingertip with an appropriate strength to obtain, from the fingertip, biological information such as a body temperature and a heartbeat. The robot device 1 may monitor a health condition and the like of the person on the basis of the obtained biological information. Such operation of the robot device 1 is performed on a person determined to be a real object.

The present disclosure can also be achieved by devices, methods, programs, systems, and the like. For example, a program that implements the functions described in the embodiment above is made downloadable, and a device that does not have the functions described in the embodiment downloads and installs the program, whereby the control described in the embodiment can be performed in the device. The present disclosure can also be achieved by a server that distributes such a program. Furthermore, the items described in the respective embodiments and variations can be combined as appropriate.

Note that the contents of the present disclosure are not construed as being limited by the effects exemplified in the present disclosure.

The present disclosure may also employ the following configurations.

(1)

An information processing apparatus including:

a reality determiner that determines whether an object detected on the basis of sensing data is a real object or an unreal object; and a controller that performs predetermined control on the basis of a result of the determination made by the reality determiner.

(2)

The information processing apparatus according to (1), in which the controller is an action controller that determines an action directed to the object on the basis of the determination result.

(3)

The information processing apparatus according to (2), in which the action controller determines an action of reacting to the object in a case where the object is a real object, and determines an action of not reacting to the object in a case where the object is an unreal object.

(4)

The information processing apparatus according to (2) or (3), in which in a case where a real object and an unreal object are mixedly present in the sensing data, the action controller determines an action for obtaining information associated with the unreal object.

(5)

The information processing apparatus according to any one of (1) to (4), further including:

a plurality of sensors, in which the controller is a sensor controller that controls on/off of each of the plurality of sensors on the basis of the determination result.

(6)

The information processing apparatus according to (5), in which the sensor controller performs control of turning on all the sensors in a case where the object is a real object, and performs control of turning on only a part of the sensors among the plurality of sensors in a case where the object is an unreal object.

(7)

The information processing apparatus according to (6), further including:

a predetermined sensor that obtains the sensing data, in which the sensor controller performs control of turning on at least the predetermined sensor in a case where the object is an unreal object.

(8)

The information processing apparatus according to any one of (1) to (7), in which the real object is an object capable of interacting with the information processing apparatus, and the unreal object is an object incapable of interacting with the information processing apparatus.

(9)

The information processing apparatus according to any one of (1) to (8), further including:

an object detector that detects the object on the basis of the sensing data.

(10)

The information processing apparatus according to any one of (1) to (9), further including:

a learning unit that performs learning related to the object on the basis of the sensing data.

(11)

The information processing apparatus according to any one of (1) to (10), in which the object is a person.

(12)

The information processing apparatus according to any one of (1) to (11), in which the sensing data is image data.

(13)

The information processing apparatus according to any one of (1) to (12), in which the information processing apparatus is configured as a self-propelled robot.

(14)

A method for processing information, the method including:

determining, using a reality determiner, whether an object detected on the basis of sensing data is a real object or an unreal object; and performing, using a controller, predetermined control on the basis of a result of the determination made by the reality determiner.

(15)

A program causing a computer to execute a method for processing information including:

determining, using a reality determiner, whether an object detected on the basis of sensing data is a real object or an unreal object; and performing, using a controller, predetermined control on the basis of a result of the determination made by the reality determiner.

REFERENCE SIGNS LIST

1 Robot device
10 Information acquisition unit
20 Information processor
40 Action controller
101 Sensing state controller
110 Image sensor
201 Reality determiner
202 Learning unit
210 Image information processing engine

The invention claimed is:

1. An information processing apparatus, comprising:
a reality determiner configured to determine whether an object, detected based on sensing data, is one of a real object or an unreal object; and
a controller configured to perform determined control based on a result of the determination by the reality determiner, wherein
the controller includes an action controller, and
in a case where the real object and the unreal object are mixedly present in the sensing data, the action controller is configured to control interaction with one of the real object or the unreal object to obtain information associated with the unreal object.

2. The information processing apparatus according to claim 1, wherein
the action controller is further configured to determine an action directed to the object, and
the determination of the action is based on the result of the determination.

3. The information processing apparatus according to claim 2, wherein the action controller is further configured to:
determine the action of reacting to the object in a case where the object is the real object; and
determine the action of not reacting to the object in a case where the object is the unreal object.

4. The information processing apparatus according to claim 2, wherein in the case where the real object and the unreal object are mixedly present in the sensing data, the action controller is further configured to determine the action to obtain the information associated with the unreal object.

5. The information processing apparatus according to claim 1, further comprising a plurality of sensors, wherein
the controller includes a sensor controller configured to control on/off of each of the plurality of sensors based on the result of the determination.

6. The information processing apparatus according to claim 5, wherein the sensor controller is further configured to:
perform control of turning on the plurality of sensors in a case where the object is the real object; and
perform control of turning on a part of the plurality of sensors in a case where the object is the unreal object.

7. The information processing apparatus according to claim 6, further comprising a determined sensor configured to obtain the sensing data, wherein
the sensor controller is further configured to perform control of turning on at least the determined sensor in a case where the object is the unreal object.

8. The information processing apparatus according to claim 1, wherein
the real object includes a first object capable of interaction with the information processing apparatus, and
the unreal object includes a second object incapable of interaction with the information processing apparatus.

9. The information processing apparatus according to claim 1, further comprising an object detector configured to detect the object based on the sensing data.

10. The information processing apparatus according to claim 1, further comprising a learning unit configured to perform learning related to the object based on the sensing data.

11. The information processing apparatus according to claim 1, wherein the object includes a person.

12. The information processing apparatus according to claim 1, wherein the sensing data includes image data.

13. The information processing apparatus according to claim 1, wherein the information processing apparatus is a self-propelled robot.

14. A method comprising:
determining, using a reality determiner, whether an object, detected based on sensing data, is one of a real object or an unreal object;
performing, using a controller, determined control based on a result of the determination by the reality determiner; and
controlling interaction with one of the real object or the unreal object to obtain information associated with the unreal object in a case where the real object and the unreal object are mixedly present in the sensing data.

15. A non-transitory computer-readable medium having stored thereon, computer-executable instructions which, when executed by a computer, cause the computer to execute operations, the operations comprising:
determining, using a reality determiner, whether an object, detected based on sensing data, is one of a real object or an unreal object;
performing, using a controller, determined control based on a result of the determination by the reality determiner; and
controlling interaction with one of the real object or the unreal object to obtain information associated with the unreal object in a case where the real object and the unreal object are mixedly present in the sensing data.

* * * * *